United States Patent Office 2,922,776
Patented Jan. 26, 1960

2,922,776

STABILIZING POLYVINYL CHLORIDE WITH ACETALS OF POLYHYDRIC ALCOHOLS

Carl Wulff, Dusseldorf-Benrath, and Manfred Dohr, Dusseldorf-Wersten, Germany, assignors to Dehydag, Deutsche Hydrierwerke G.m.b.H., Dusseldorf, Germany, a corporation of Germany No Drawing. Application May 17, 1955
Serial No. 509,097

Claims priority, application Germany May 19, 1954

11 Claims. (Cl. 260—45.8)

This invention relates to stabilizing and softening agents for halogenated organic compounds, and more particularly to stabilizing and softening agents for halogenated organic high polymers.

It is well known that when halogenated organic compounds, particularly halogenated organic polymeric compounds, are exposed to heat and/or light for extended periods of time they tend to decompose. This decomposition is in most cases accompanied by a discoloration, and in the case of halogenated high polymers also by an increase in brittleness. The discoloration and the increase in brittleness are of great disadvantage in the use, storage and processing of such halogenated organic compounds.

It is an object of the present invention to provide additives for halogenated organic compounds which, when admixed therewith, will prevent such compounds from decomposing under the action of heat and light.

It is another object of the present invention to provide additives for halogenated organic compounds which will prevent such compounds from discoloring or becoming excessively brittle under the influence of heat and light.

Other objects and advantages of our invention will become apparent as the description thereof proceeds.

We have found that the condensation products of a condensation reaction between aldehydes and organic polyhydroxy compounds or their derivatives exhibit excellent stabilizing properties, and that such condensation products are valuable stabilizing agents for halogenated organic compounds. In other words, we have found that when such condensation products are admixed with halogenated organic compounds, particularly with halogenated organic polymers, they exert a stabilizing effect upon such organic compounds and prevent the same from decomposing, discoloring and becoming excessively brittle.

More particularly, we have found that condensation products containing the characteristic acetal group

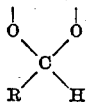

in the molecule produce the above beneficial effects. The acetal group is a component of a 5-, 6-, 7- or 8-membered ring system and may occur once or several times in the molecule of the condensation product. In the above acetal group, R represents hydrogen or a hydrocarbon radical, which may be an unsubstituted or a substituted radical and may also contain hetero-atoms or hetero-atom groups in the hydrocarbon chain or ring. The number of atoms in the ring system depends upon the position of the hydroxyl groups in the molecule of the polyhydroxy alcohol which is used as the condensation reactant for the aldehyde. Thus, if the hydroxy compound is a dihydroxy alcohol, the number of atoms in the ring system containing the characteristic acetal group will depend upon whether the hydroxyl groups are in the 1,2-, 1,3-, 1,4- or 1,5-positions.

Condensation products of aldehydes and polyhydroxy alcohols are well known per se and they have heretofore been used as solvents and softening agents for cellulose derivatives, but we believe that their stabilizing influence upon halogenated organic compounds has heretofore not been known. These condensation products can be produced in a very simple fashion according to known methods, for example by subjecting an aldehyde and a polyhydroxy alcohol to a condensation reaction in the presence of acid catalysts while removing or tying up the water split off during the condensation reaction.

Examples of suitable polyhydroxy compounds adapted for use in forming the aldehyde condensation products, which we have found to be excellent stabilizing agents for halogenated organic compounds, are the following: Ethylene glycol, 1,2- and 1,3-propylene glycol, 1,2-, 1,3- and 1,4-butylene glycol, 1,2- and 1,5-pentamethylene glycol 1,4-butanediol, glycerin, diglycerin, 1,2,3-butyl glycerin, 1,2,3-pentanetriol, 1,3,5-hexanetriol, sorbitol, mannitol, dulcitol, hexoses and the like, as well as cycloaliphatic or aromatic hydroxyl compounds, such as 1,2-cyclohexanediol, pyrocatechol (1,2-benzenediol) and the like.

Examples of suitable aldehydes for the formation of the condensation products are formaldehyde, acetaldehyde, glyoxal, butyraldehyde, lauric aldehyde, myristic aldehyde, benzaldehyde, furfural, phenylacetaldehyde and the like.

The polyhydroxy compounds as well as the aldehydes used in the production of the condensation products may also carry substituent radicals, such as, for example, oxy-groups, ester groups, carboxylic acid and sulfonic acid amide groups, cyclic and hetero-cyclic radicals, such as aryl radicals, pyridine radicals, thiophene radicals and the like.

The molecules of these aldehyde-polyhydroxy alcohol condensation products may further be modified by the introduction of organic radicals, for example by etherification or esterification of free hydroxyl groups. In most cases, and particularly in those cases where the polyhydroxy compound used in the formation of the condensation product has more than two hydroxyl groups, the condensation product still contains one or more free hydroxyl groups. The same result can be achieved by subjecting the aldehyde to a condensation reaction with ethers or esters, particularly high-molecular ethers or esters, of polyhydroxy alcohols instead of the polyhydroxy alcohols themselves, provided such ethers or esters contain at least two hydroxyl groups capable of entering into a condensation reaction with aldehydes to form condensation products comprising the above characteristic acetal group. Suitable etherifying or esterifying agents for this purpose are acyclic or cyclic hydroxy compounds or carboxylic acids, respectively, having at least six carbon atoms in the molecule. Such etherifying or esterifying agent may, however, also contain heteroatoms, such as oxygen, nitrogen or sulfur atoms, or corresponding atom groups in the molecule. Of particular practical interest are those modified condensation products in which the free hydroxyl groups of the initial condensation product have subsequently been esterified with high-molecular fatty acids or with polycarboxylic acid, such as oxalic acid, succinic acid, adipic acid, diadipic acid, sebacic acid and the like. If desired, the esterification of the hydroxyl groups can be accomplished by first subjecting the aldehyde-polyhydroxy alcohol condensation products to an addition reaction with an alkyleneoxide, particularly with ethyleneoxide, and subsequently esterifying the resulting oxyalkylation product with the desired fatty acid or polycarboxylic acid, as above indicated.

In all of the above cases the modified or unmodified condensation products contain the characteristic, cyclicly linked acetal group, and their molecular size and weight are variable depending upon the number and size of the radicals introduced by etherification or esterification, as the case may be.

The esterified or etherified condensation products of the type described above are not only effective as stabilizing agents for halogenated organic compounds, but also have a softening and plasticizing effect upon such halogenated compounds which is dependent upon the molecular size and the type of high-molecular radical introduced into the condensation product by esterification or etherification. In addition, if the modified condensation products do not exhibit a softening or plasticizing effect in the strictest sense of the word, they have been found to be very effective extenders.

Specific examples of organic aldehyde-polyhydroxy alcohol condensation products which can be used as stabilizing agents or as stabilizing and plasticizing agents for halogenated organic compounds in accordance with the present invention are the following: 1,2-formalglycol, 1,2 - formalglycerin, 1,3 - acetaldehyde-acetalpropanediol, 1,3-formal-butanediol, 1,3-dioxan, 1,2-benzaldehyde-acetalglycol, 1,2-furfural-acetalglycol, sorbitol-diformal, and the like.

Specific examples of modified condensation products having a pronounced plasticizing effect are the etherification products and esterification products of cyclic acetals containing hydroxyl groups, such as 1,2-formalglycerin-capric acid ester, 1,2-formalglycerin-lauric acid ester, 1,3-formalglycerin oleic acid ester, 1,2-acetaldehyde-acetalglycerin-caprilic acid ester, 1,3-acetaldehyde-acetalglycerin-naphthenic acid ester, 1,3-acetaldehyde-acetalglycerin-benzoic acid ester, benzaldehyde-acetalglycerin-lauric acid ester, benzaldehyde-acetalglycerin-oleic acid ester, or mixtures thereof such as they are obtained in synthetic manufacture. Further examples are the esters formed by esterifying cyclic acetals containing hydroxyl groups with polybasic carboxylic acids, such as oxalic acid-di-1,2-formalglycerin ester, adipic acid-di-1,3-formalglycerin ester, diadipic acid-tetra-1,2-acetaldehyde-acetalglycerin ester and the like.

Compounds suitable for use as stabilizing and softening agents for halogenated organic compounds in accordance with our invention may also be formed by condensing mono- or dicarboxylic acid esters of polyhydroxy alcohols with formaldehyde, acetaldehyde and the like, provided such esters contain at least two free hydroxyl groups capable of forming the characteristic acetal group described above. Still further, the acetals of those compounds may be used as softening and stabilizing agents which contain esterified carboxyl groups in addition to two or more hydroxyl groups, such as the acetalized, neutral esters of polybasic polyoxy carboxylic acids, for example of tartaric acid, saccharic acids, mucic acid and the like. Finally, other suitable acetal compounds are those derivatives of hydroxyl-substituted, cyclic acetals in which, for example, the hydroxyl groups were first transformed into polyether radicals by a reaction with ethyleneoxide and subsequently esterified with monobasic or polybasic carboxylic acids.

The acetal compounds used as stabilizing agents and/or plasticizing agents and/or extenders in accordance with the present invention may be employed in conjunction with all types of halogenated organic compounds which tend to decompose, discolor or turn brittle under the action of heat and light. For example, they may be employed in conjunction with halogenated organic esters, halogenated hydrocarbons, such as chloroparaffins, halogenated high polymers, such as halogenated polyvinyl and polyvinylidene compounds, halogenated natural and synthetic rubber, halogenated polystyrene and the like.

In order to achieve the advantageous stabilizing, plasticizing or extending results, the acetal condensation products are worked into the halogenated compounds, either alone or in admixture with known softeners and gelatinizers, in an amount ranging from 1–70%, preferably 5–30%, based upon the weight of halogenated compound, in accordance with well known procedures. The resulting compositions may take the form of solutions, emulsions, pastes, threads, ribbons, films, foils, rods, tubes, plates, blocks, etc., and are marked by their extraordinary stability under the action of light and heat. Moreover, if the composition is a solid shaped product and the stabilizing additive is a high-molecular derivative of a cyclic acetal, such solid products exhibit excellent elastic characteristics and pliability.

The following examples will further illustrate our invention and enable others skilled in the art to understand the invention more completely. It is understood, however, that the examples are given only as an illustration of the broad concept of our invention without any intent of limiting the scope of the invention thereto.

*Example I*

70 parts by weight of polyvinylchloride were intimately admixed with 30 parts by weight of the ester produced by an esterification reaction between formalglycerin and lauric acid. The resulting mixture was then gelled at 140° C. on heated rollers. A clear, pliable foil was obtained which did not discolor even upon heating the same at 160° C. for about one hour.

As a comparison, a polyvinylchloride foil modified with dioctylphthalate as a softening additive was heated under the same conditions. It turned brown after a short period of time.

Instead of the lauric acid ester of formalglycerin, the dicaprylic acid ester of 4-oxybutyraldehyde-acetalglycerin was used with equally effective stabilizing results.

*Example II*

70 parts by weight of polyvinylchloride were intimately admixed with 10 parts by weight of the myristic acid ester of acetalglycerin. To this mixture, 20 parts by weight of dioctylphthalate and 1 part by weight of titanium-dioxide were added. The resulting composition was then gelled on heated rollers at 160° C. The product obtained thereby was a pure white, pliable foil which did not discolor during storage or upon being heated at 170° C. for one hour.

Similar advantageous stabilizing results were obtained by modifying the polyvinylchloride with the neutral ester formed by esterifying 2 mols of formalglycerin with 1 mol of sebacic acid, instead of using the myristic acid ester of acetalglycerin as the stabilizing agent.

*Example III*

70 parts by weight of polyvinylchloride were intimately admixed with 30 parts by weight of the lauric acid ester of the addition product of 5 mols ethylene oxide to 1 mol formalglycerin. The resulting composition was then gelled on heated rollers at 150° C. whereby a completely colorless foil was produced. This foil was stable under the action of heat and light and further remained soft and pliable at very low temperatures.

*Example IV*

60 parts by weight of polyvinylchloride were admixed with 40 parts by weight of the myristic acid ester of benzaldehyde-acetalglycerin. The resulting mixture was then gelled at 160° C. on heated rollers. The product obtained thereby was a clear, colorless, elastic foil which was completely stable under the action of heat and light.

*Example V*

70 parts by weight of polyvinylchloride were intimately admixed with 30 parts by weight of the esterification product produced by a reaction between 1 mol of phthalic acid anhydride and 2 mols of benzalglycerin. The resulting mixture was gelled at 170° C. on heated rollers. The product obtained thereby was a clear, pliable foil which was highly stable under the action of heat and light, and further showed improved resistance against decomposition in the presence of gasoline. Upon storage in gasoline for 24 hours, the loss in weight was only 0.24%.

*Example VI*

70 parts by weight of polyvinylchloride were admixed with 15 parts by weight of dioctylphthalate and 15 parts by weight of the phthalic acid ester of dibenzalglycerin. The resulting mixture was gelled at 170° C. on heated rollers, whereupon a clear, pliable foil was produced. The foil was stable under the action of heat and light, and after storage in gasoline for 24 hours, the loss in weight was 4.82%.

While we have given certain specific embodiments of our invention, it will be understood that the invention is not limited to these embodiments. In particular, the acetal compounds described in the examples may be admixed with halogenated organic compounds other than polyvinylchloride, and will produce equally advantageous stabilizing and plasticizing results in admixture with chlorinated rubber, chlorinated hydrocarbons, chlorinated polyvinylidene compounds, for example. Thus, various changes and modifications may be made without departing from the spirit of the invention or the scope of the appended claims.

We claim:

1. A method for stabilizing polyvinyl chloride which comprises admixing therewith at elevated temperatures a stabilizing and plasticizing agent selected from the group consisting of 1,2- and 1,3-acetals of alcohols having from 3 to 6 hydroxy groups, wherein the free hydroxy groups of said stabilizing agent are esterified with a high molecular weight carboxylic acid containing from at least 6 to 18 carbon atoms, wherein said stabilizing agent is added to said chlorinated compound in an amount from 1 to 70% based on the weight of the chlorinated compound.

2. The process of claim 1 wherein the alcohol is glycerin.

3. A method for stabilizing polyvinyl chloride which comprises admixing therewith at elevated temperatures a stabilizing and plasticizing agent selected from the group consisting of 1,2- and 1,3-acetals of alcohols having from 3 to 6 hydroxy groups, wherein the free hydroxy groups of said stabilizing agent are esterified with a carboxylic acid containing from at least 6 to 18 carbon atoms, wherein said stabilizing agent is added to said chlorinated compound in an amount from 1 to 20% based on the weight of the chlorinated compound.

4. A method for stabilizing polyvinyl chloride which comprises admixing therewith at elevated temperatures from 1 to 70%, based on the weight of said polyvinyl chloride, of the lauric acid ester of formalglycerin as a stabilizing and plasticizing agent.

5. A composition of matter comprising polyvinylchloride and from 1 to 70%, based on the weight of the polyvinyl chloride, of the phthalic acid ester of benzalglycerin.

6. A composition of matter comprising polyvinylchloride, from about 20 to 30% of dioctylphthalate, and from 1 to 70%, based on the weight of the polyvinylchloride, of the phthalic acid ester of dibenzalglycerin.

7. A composition of matter comprising polyvinylchloride and from 1 to 70%, based on the weight of the polyvinyl chloride, of the lauric acid ester of formalglycerin.

8. A composition of matter comprising polyvinylchloride, from about 20 to 30% of dioctylphthalate, from about 1 to 2% titaniumdioxide and from 1 to 70%, based on the weight of the polyvinyl chloride, of the myristic acid ester of acetalglycerin.

9. A composition of matter comprising polyvinylchloride, from about 20 to 30% of dioctylphthalate, from about 1 to 2% titaniumdioxide and from 1 to 70%, based on the weight of the polyvinyl chloride, of the neutral sebacic acid ester of formalglycerin.

10. A composition of matter comprising polyvinylchloride and from 1 to 70%, based on the weight of the polyvinyl chloride, of the lauric acid ester of the addition product formed by an addition reaction between 1 mol of formalglycerin and 5 mols of ethyleneoxide.

11. A composition of matter comprising polyvinylchloride and from 1 to 70%, based on the weight of the polyvinyl chloride, of the myristic acid ester of benzaldehydeacetalglycerin.

References Cited in the file of this patent

UNITED STATES PATENTS

| | | |
|---|---|---|
| 2,028,403 | Mares | Jan. 21, 1936 |
| 2,065,125 | Dreyfus | Dec. 22, 1936 |
| 2,234,615 | Alexander | Mar. 11, 1941 |
| 2,350,350 | Gresham | June 6, 1944 |